US006117381A

United States Patent [19]

Cummings

[11] Patent Number: 6,117,381

[45] Date of Patent: Sep. 12, 2000

[54] METHOD AND APPARATUS FOR PROVIDING A GAPLESS ORDER CHANGE IN A CORRUGATOR

[75] Inventor: James A. Cummings, Phillips, Wis.

[73] Assignee: Marquip, Inc., Phillips, Wis.

[21] Appl. No.: 09/075,773

[22] Filed: May 11, 1998

[51] Int. Cl.[7] .............................. B26D 3/12; B32B 31/18

[52] U.S. Cl. .............................. 264/269; 83/408; 83/428; 156/271; 156/353; 156/523

[58] Field of Search .................................... 156/250, 269, 156/271, 353, 470, 210, 523, 524, 529; 83/428, 408

[56] References Cited

U.S. PATENT DOCUMENTS

| | | |
|---|---|---|
| 4,976,676 | 12/1990 | Mensing et al. . |
| 5,152,205 | 10/1992 | Yoshida et al. . |
| 5,496,431 | 3/1996 | Hirakawa et al. . |
| 5,857,395 | 1/1999 | Bohm et al. . |
| 5,918,519 | 7/1999 | Schnabel et al. ......................... 83/428 |
| 5,929,170 | 7/1999 | Grill et al. . |

FOREIGN PATENT DOCUMENTS

| | | |
|---|---|---|
| 44 25 155 | 7/1994 | Germany . |

*Primary Examiner*—Mathieu D. Vargot
*Attorney, Agent, or Firm*—Andrus, Sceales, Starke & Sawall

[57] ABSTRACT

A gapless order change in a continuous running corrugated web is provided by utilizing a partial web sever extending transversely across the web upstream of a web selector device. The partial web sever allows the output web selector device to be readjusted downstream of the slitter-scorer to redirect the output webs between upper and lower cut-off knives as required. The partial web sever allows the order change to be effected with a continuous unbroken web containing the outs for the cut-off knife level handling the output web portions opposite the partial sever.

17 Claims, 4 Drawing Sheets

METHOD AND APPARATUS FOR PROVIDING A GAPLESS ORDER CHANGE IN A CORRUGATOR

BACKGROUND OF THE INVENTION

The present invention pertains to a system for facilitating an order change in the dry end conversion of a corrugated paperboard web. In particular, the invention relates to a method and apparatus for maintaining web continuity during an order change.

In a corrugator dry end, where a corrugated paperboard web is longitudinally scored and slit into multiple parallel output webs (or "outs"), the outs are directed through one or more downstream cut-off knives which cut the output webs into selected sheet lengths. When two cut-off knives are used, they are vertically separated and each is capable of cutting the full corrugator width web. A web selector positioned downstream of the slitter-scorer, divides the outs into two groups, one of which is directed to the upper cut-off knife and the other to the lower cut-off knife. Order changes must be effected while the upstream corrugator wet end continues to produce and deliver the continuous web to the slitter-scorer. An order change will typically result in a change in widths of the output webs, requiring redirection of at least a central portion of the web from one knife level to the other and possibly changes in edge trim widths as well.

The prior art has developed two basic order change systems for corrugator dry ends utilizing double level cut-off knives. One system is known as a gapless or plunge style order change system. In this system, there are two slitter-scorer stations immediately adjacent one another in the direction of web movement and through both of which the web travels. At order change, one slitter-scorer, operating on the currently running order, will lift out of operative engagement with the web, and the other slitter-scorer which is set to the new order alignment plunges down into operative engagement with the web. The result is a small order change region of corrugated web with overlapping slits and scores for both the running and the new orders.

Any gapless order change system must be able to accommodate redirection of the central portion of the web in the web selector device from one knife level to the other. In U.S. Pat. No. 5,496,431, a laterally adjustable cutting tool, positioned over the center of the web, makes a running diagonal cut to provide a smooth transition in the widths of the output webs directed to the upper and lower cut-off knives, allowing a repositioning of the web directing forks in the web selector device. In this system, the order change region of the web containing the diagonal connecting slit and the overlapping slit and score lines requires the use of separate diverters downstream of each of the upper and lower cut-off knives to divert the resultant scrap sheets. The diagonal pieces which are created by the system of this patent cannot be discharged in the usual manner onto the top of the stack, particularly when changing from a narrow web to a wide web on either knife level. The diagonal piece would fall off the top of the stack. Therefore, the system of this patent must have a diverter after each knife level.

In German Patent 44 25 155, the output webs exiting the slitter-scorer are simultaneously cut to chop out a scrap sheet containing the overlapping slits and scores from the running and new orders. The gap created by chopping out the scrap portion allows repositioning of the web directing forks at the web selector device. This system is not a true gapless order change, but does utilize pairs of alternately operable plunge cut slitter-scorers. This system also requires a separate rotary shear and a scrap sheet diverter between the slitter-scorer and the cut-off knife. In addition, because the scrapped out sheets may have many slits resulting in a limp and unstable sheet, they are difficult to divert and often result in jams.

The other type of order change system, a gap style order change system requires the use of a rotary shear located immediately downstream of the corrugator wet end. At order change, the rotary shear is operated to make a cross cut through the entire web. The downstream dry end equipment is accelerated to pull a gap between the tail edge of the running order and the leading edge of the new order defined by the shear cut. As the tail edge of the web passes through the slitter-scorer, the slitting and scoring tools can be repositioned in the gap and set for the new order. Alternately operable plunge cut slitter-scorers may also be used in a gap style order change. Similarly, as the trailing edge passes through the web selector device, it can be reset to change the direction of outs in the leading edge of the new order between the top and bottom cut-off knives.

SUMMARY OF THE INVENTION

In accordance with the present invention, an order change is effected without severing the web completely at the rotary shear, and by using a plunge cut slitter-scorer having two slitter-scorer stations. The apparatus and method of the present invention utilize a partial sever transversely across the web at a position between the conventional rotary shear and the web selector device immediately downstream from the slitter-scorer. The partial web sever may extend from either lateral edge of the web with the preferred choice of edge based upon the narrowest set of outs for the new order. The partial web sever allows the output web selector device to be readjusted downstream of the slitter-scorer to redirect the output webs between the upper and lower cut-off knives as required. Two alternately operable slitter-scorers are utilized as in prior art gapless systems. The partial web sever allows the order change to be effected with a continuous unbroken web containing the outs for the cut-off knife level handling the output web portions opposite the partial sever.

The order change strategies described herein may be efficiently executed with a new web selector fork construction and operating method as described in my copending application Ser. No. 09/075,772 entitled "Method and Apparatus for Facilitating a Gapless Order Change in a Corrugator".

In its most basic embodiment, the apparatus of the present invention is used in a corrugator of the type which includes a slitter-scorer operable to provide longitudinal slit lines and score lines in a continuous corrugated paperboard web passing therethrough. The slit lines divide the web into a plurality of output webs of selected widths which are directed into a pair of vertically separated cut-off knives that cut the webs into selected sheet lengths. Between the slitter-scorer and the cut-off knives, an output web selector device directs respective upper output web portions and lower output web portions into the upper and lower cut-off knives. A web cutting device upstream of the web selector device operates to provide a generally transverse slit in an order change region of the web which region defines a change in total widths of the respective upper and lower output web portions from a running order to a new order. The transverse slit extends inwardly from one lateral edge and severs at least a portion of the web representative of the larger of the total widths of the running and new order widths of one of said upper and lower output web portions. The innermost running order and new order output webs of the other of said upper and lower output web portions remain at least partially uncut by said transverse slit.

Preferably, the cutting device is operative to provide the transverse slit in the web portion representative of the narrower of the new order upper and lower output web portions. The output web separating device operates in the order change region on a portion of the innermost output web of the running order which has been cut by the transverse slit. The slitter-scorer includes independently operable slitter-scorer tools for each of the running and new orders and, in operation, the order change region includes longitudinally overlapping slit lines and score lines of the running and new orders. The slitter-scorer is operable to move the running order slitter-scorer tools out of operative engagement and the new order slitter-scorer tools into operative engagement with the web in the order change region.

The web cutting device preferably comprises a rotary shear. The rotary shear may comprise a pair of shearing blades mounted axially separated and 180° out of phase, each of which blades is adapted to provide a transverse slit from an opposite lateral edge over approximately one-half the width of the web. In a presently preferred embodiment, the web cutting device comprises a pair of rotary shears mounted to slit opposite edges of the web. In the preferred embodiment, each of said rotary shears is adapted to slit approximately one-half of the width of the web. The transverse slit may be provided by a cutting device comprising a slitting tool adapted to move laterally across the web. The transverse slit may be perpendicular to the edge of the web or lie at an acute angle to a line perpendicular to said edge.

The method of the present invention comprises the steps of (1) determining an order change region in the web which region defines a change in total widths of the respective upper and lower output web portions from a running order to a new order, (2) severing the web upstream of the web selector device to provide a generally transverse slit in the order change region from one edge of the web inwardly such that it sequentially severs at least the innermost of both the running order and new order output webs corresponding to that one edge, (3) adjusting the slitter-scorer in the order change region to terminate the running order slit and score lines and to begin the new order slit and score lines, and (4) maintaining the continuity of the innermost running order and new order output webs corresponding to the other edge of the web.

Preferably, the adjusting step of the foregoing method comprises (1) moving a first set of slitter-scorer tools out of operative engagement with the web, and (2) moving a second set of slitter-scorer tools into operative engagement with the web. The severing step preferably comprises cutting the web with a rotary shear. The severing step also preferably provides a transverse slit extending to approximately the longitudinal centerline of the web. The transverse slit typically extends from the edge of the web containing the narrower of the new order upper and lower output web portions. However, web redirection requirements at order change may dictate slitting from the opposite edge.

DETAILED DESCRIPTION OF THE PREFERRED EMBODIMENT

Figure 1:
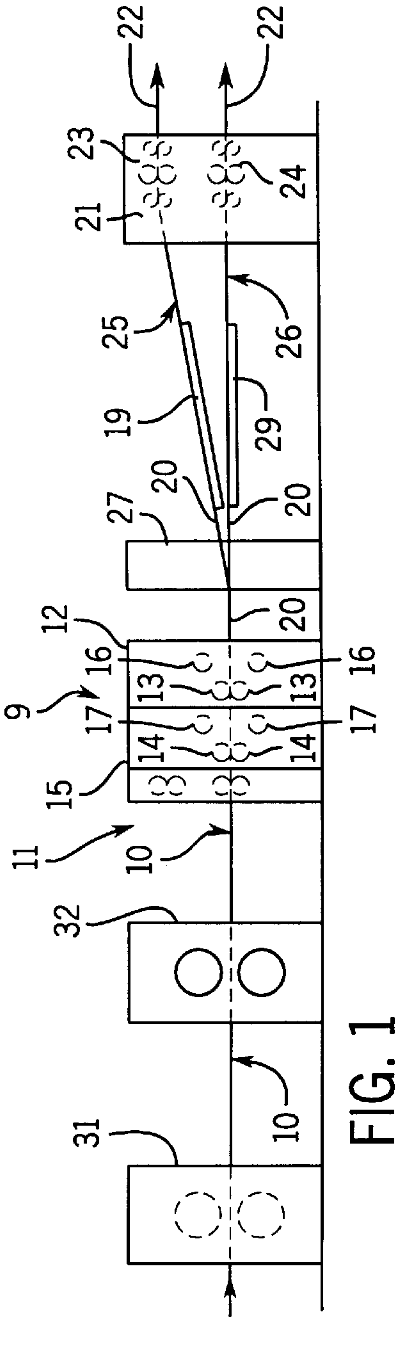
FIG. 1 is a schematic side elevation of a corrugator dry end modified to incorporate the apparatus and to practice the method of the present invention.

Referring to FIG. 1, a continuous corrugated paperboard web 10 enters a corrugator dry end 11 from an upstream wet end (not shown) where the component webs are processed, glued together and cured for dry end processing. The dry end system shown is adapted to process order changes by using either a gap style system or a gapless plunge type system of the present invention. While an order is running, the continuous web 10 passes through a slitter-scorer station 9, including a slitting station 12 having two pairs of upper and lower slitting tools 13 and 16, and a scoring station 15 having two pairs of scoring tools 14 and 17. However, only one pair of slitting tools 13 and one pair of scoring tools 14 is in operative engagement with the web 10 while the order is being run. The other pairs of slitting tools 16 and scoring tools 17 are inoperative and, as shown, are withdrawn from operative contact with the web. In the slitting station 12 and the scoring station 15, the web 10 is provided with longitudinal score lines (not shown) and longitudinal slit lines 18, which are shown schematically in various order patterns in the webs of FIGS. 2–6, 8–11. The continuous longitudinal slits 18 define a series of output webs or outs 20 which continue downstream into a cut-off knife 21 where the webs are cut into selected length sheets 22. The sheets 22 are conveyed downstream into a stacker (not shown) or other suitable collecting device.

Figure 2:
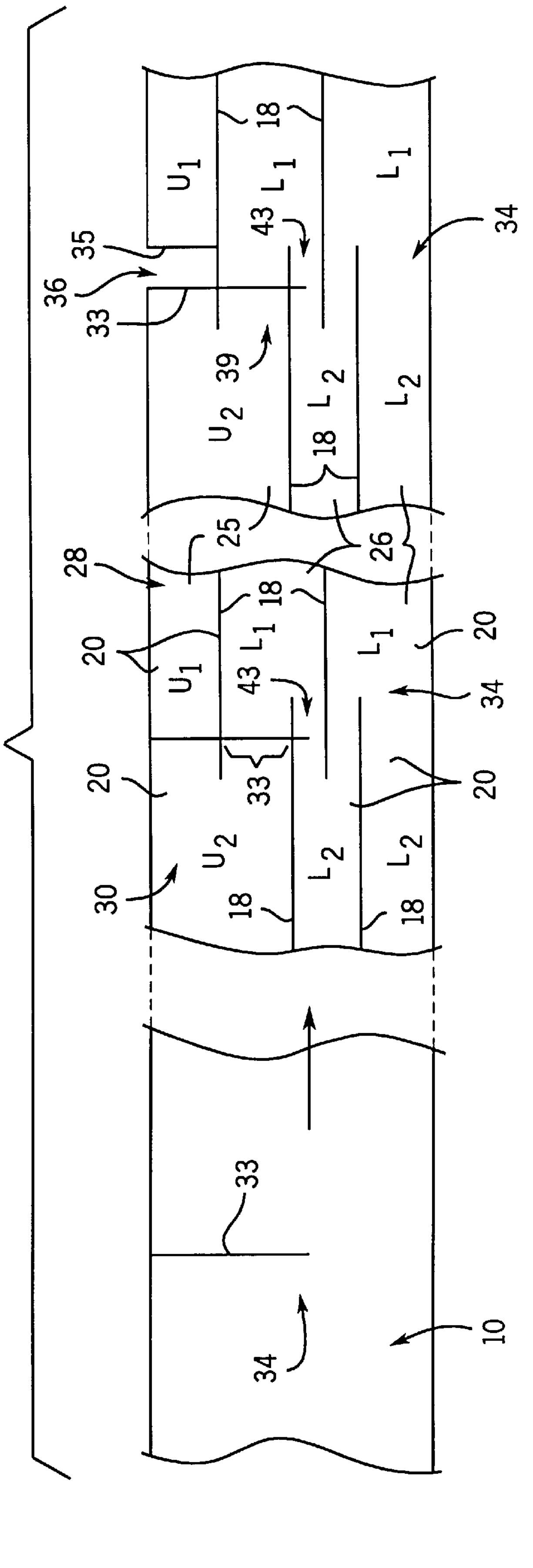
FIG. 2 is a schematic top plan view showing the order change sequence in a traveling paperboard web processed by the apparatus and method of the present invention.

In the system shown in FIG. 1, a two level or duplex cut-off knife 21 includes an upper cut-off knife 23 and a lower cut-off knife 24. Each of the knives 23 and 24 is capable of processing any arrangement of outs 20 up to the full width of the web 10. However, two cut-off knives are typically utilized to enable two independent sheet orders to be processed simultaneously, where the sheet lengths and widths may vary considerably between running orders. Thus, one set of upper output web portions 25 is directed to the upper cut-off knife 23 and a set of lower output web portions 26 is directed into and through the lower cut-off knife 24. The output webs 20 exiting the slitter-scorer station 9 are separated vertically in a web selecting device 27 in which selectively positionable forks in an array extending across the full width of the web 10 are positioned to direct the respective upper and lower output web portions 25 and 26 to the correct cut-off knife 23 or 24. The forks in the web selector 27 are thus selectively positioned to direct the respective output web portions 25 and 26 onto upper and lower slider tables 19 and 29 which support the outs and direct them into their respective knives 23 and 24. In FIG. 2, for example, the current running order is comprised of a single upper output web 25 also identified as $U_1$ and a pair of lower output webs 26, each identified as $L_1$. Furthermore, the FIG. 2 example assumes that an order change will result in an immediately following new order 30 comprising a single upper output web $U_2$, substantially wider than running order output web $U_1$, and a pair of lower output webs $L_2$, each narrower in width than the running order lower output webs $L_1$.

In the schematic system shown in FIG. 1, an upstream rotary shear 31 is shown for use in a gap-type order change system. As indicated above, rotary shear 31 provides a complete web cross cut, but is not utilized with the gapless order change of the present invention. Instead, an order change signal is used to operate a second rotary shear 32 which is positioned between the conventional rotary shear 31 and the web selector device 27 to provide a partial web sever in the form of a transverse slit 33. The transverse slit 33 preferably extends slightly more than half the width of the web 10 and, therefore, rotary shear 32 has an effective cutting blade length sufficient to provide said transverse slit 33. In order to adapt the system of the invention to handle order changes of any size, a similar rotary shear 32 (not shown) is positioned adjacent the first, but on the opposite side of the web to provide a similar transverse slit from that opposite edge. The transverse slit 33 defines the approximate longitudinal center of an order change region 34 where the slitting and scoring tools 13 and 14 operating on the running order 28 are retracted and the slitting and scoring tools 16 and 17, preset to handle the new order 30, are "plunged" into operative engagement with the web 10. Thus, as shown in the center transitional view in FIG. 2, the order change region 34, carrying the transverse slit 33, exits the slitter-scorer with overlapping slit lines 18 from the running order 28 and the new order 30. This region will also include overlapping of score lines (not shown) from the running and new orders.

The substantial increase in width of the upper output web $U_2$ in the new order 30 from the upper output web $U_1$ of the running order 28 requires that a portion of the width of the immediately adjacent output web $L_1$ of the running order 28 be diverted from the lower knife level 24 to the upper knife level 23 in order to effect the order change. The transverse slit 33 provides the break in the web 10 which allows the selector forks in the web selecting device 27 to be repositioned to redirect the web portion 39 defining the transition from running order web $L_1$ to new order web $U_2$. However, a portion 43 of innermost running order web $L_1$ is not severed by the transverse slit 33 and is connected to the innermost output web $L_2$ of the new order 30. The order change is, therefore, effected at the slitter-scorer with no gap and with a continuous web (output web portions $L_1$ and $L_2$) into the lower cut-off knife 24.

Figure 12:
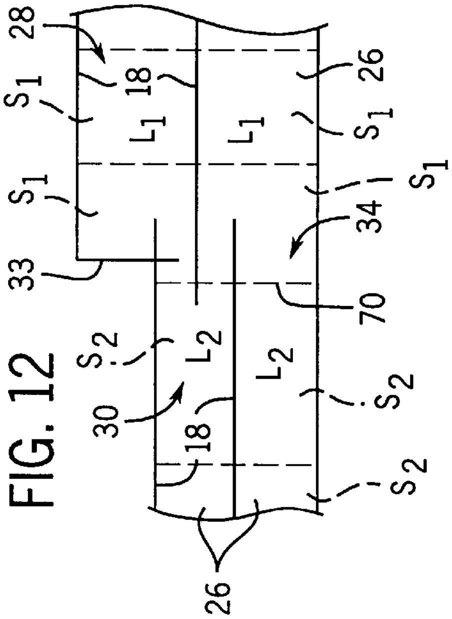
FIGS. 12 and 13 are schematic views of end of order knife cut strategies for the lower output web portions of FIG. 2.
Figure 13:
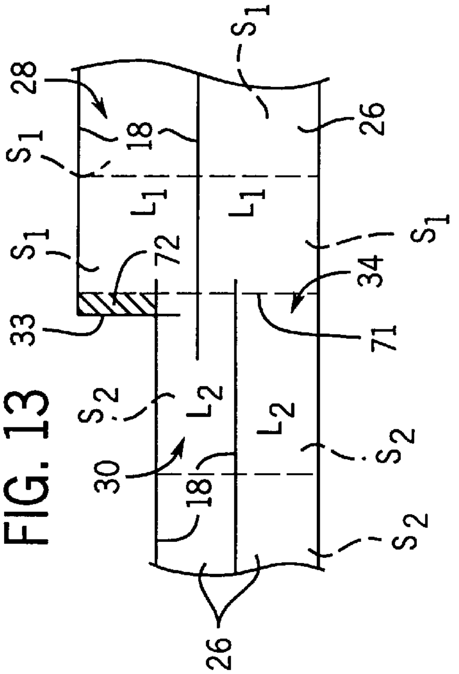

In the righthandmost transitional view of FIG. 2, the transverse slit 33 may be synchronized exactly with the end of the running order 28 such that the tailout end 35 of running order output web $U_1$ coincides with the slit 33. A gap 36 between the transverse slit 33 and the tailout end 35 is formed as web $U_1$ accelerates away from web $U_2$ as a result of the overspeed of the pull roll at downstream knife 23. However, because it will normally not be possible to also attain exact synchronization of the transverse slit 33 and the subsequent knife cut defining the end of the order for the lower output webs $L_1$, an alternate end of order knife cut strategy needs to be considered. This is shown in FIGS. 12 and 13 which are taken from FIG. 2, but show only the lower output web portions $L_1$ and $L_2$ of the running and new orders 28 and 30, respectively. In these figures, the running order and new order sheet lengths provided by the downstream lower cutoff knife 24, are defined by the transverse dash lines and are designated, respectively, $S_1$ and $S_2$. It is important to assure that the end of order knife cut 70 (defining the transition from sheets $S_1$ to $S_2$) is biased to assure that it occurs upstream of the transverse slit 33. This is shown in FIG. 12. Otherwise, if the knife cut defining the tailout end of running order webs $L_1$ is biased to the downstream side of slit 33, as shown in FIG. 13, a short scrap piece 72 would be cut in the tail of the innermost output web portion of running order $L_1$ that could result in a jam-up. The tail end sheets cut from the lower output web portions $L_1$ of the expiring order will have overlapped slits and score lines but, because only the upper run $U_1$ can be synchronized with the order change, the resultant waste sheets in the transition between webs $L_1$ and $L_2$ would be scrapped in any event. These scrap sheets, created at the tail end of the order, would end up on the top of the stack where the top sheet is considered scrap anyway. Similarly, scrap associated with overlapping slits and scores on the leading edge of output web portions $L_2$ for the new order would go into the stacker as the first sheet in the stack and would also generally be considered scrap because of conveyor damage.

In the order change sequence just described with respect to FIG. 2, the rather wide redirected web portion 39 which must be redirected from the lower to the upper knife level, must be vertically separated from the tail of web $L_1$ early enough to prevent the lead edge of new output web $U_2$ from colliding with the upstream edge of the slider table 19. However, this may result in the tail end of running order output web $L_1$ being lifted as well and forced through a narrow window between the downstream end of the raised forks and the upstream end of the upper slider table 19. The lack of precise timing or the processing of heavy wall corrugated board may result in damage to either the tail end of web $L_1$ or the lead end of web $U_2$ along the redirected web portion 39.

Figure 3:
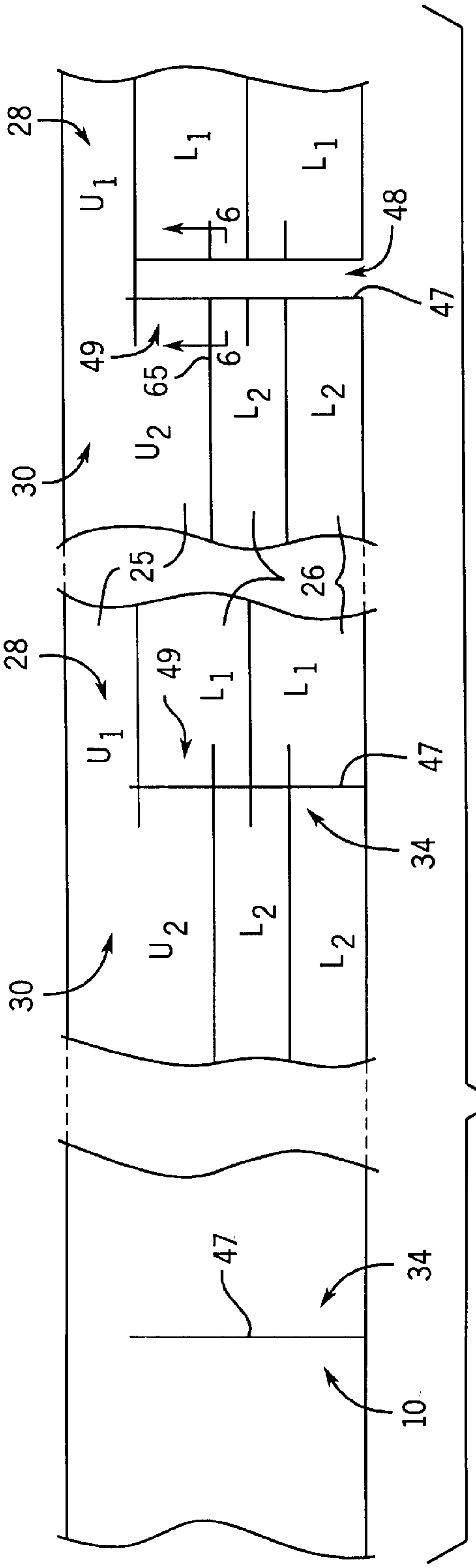
FIG. 3 is a schematic representation of an alternate strategy for effecting the order change of FIG. 2.

However, the foregoing difficulty may be avoided by utilizing the strategy shown in FIG. 3. In this alternate order change strategy, the old and new output web portions 25 and 26 are identical to those in the FIG. 2 example. In FIG. 3, however, the web is severed with a transverse slit 47 which extends inwardly from the edge of the web opposite that of slit 33 in the FIG. 2 example. As shown, the slit 47 must be long enough to extend at least the full width of the running lower output web portions $L_1$ (which are wider than the corresponding new order web portions $L_2$). As soon as the order change region 34 carrying the transverse slit 47 leaves the slitter 11, the overspeed pull rolls in the lower level knife 24 will pull a gap 48 between the running and new lower output web portions $L_1$ and $L_2$, as shown in the righthandmost view of FIG. 3. The gap 48 will provide adequate space to allow the forks in the web selector 27 to be raised along the width of a redirected portion 49 forming a part of output web $L_1$ after the tail edge of $L_1$ has left the forks and before the lead edge of $U_2$ is fully onto the forks. It should be noted that the redirected web portion 49 corresponds to the same redirected web portion 39 in the FIG. 2 example.

The potential problem created by the relatively wide redirected web portion 39 in the FIG. 2 example, which is obviated by the strategy described with respect to FIG. 3, suggests an order change strategy based upon the relative widths of the upper output web portions 25 of the old and new orders $U_1$ and $U_2$, respectively. If the total width of the new order outs $U_2$ is greater than the total width of the running order outs $U_1$, the slit should be made from the opposite side (as in the FIG. 3 example). If the width of new order $U_2$ is narrower than the width of running order $U_1$, then the slit may be made from either side, depending upon the narrowest new order upper and lower output web portions 25 or 26 (thereby keeping the length of the transverse slit 33 or 47 as short as possible).

Figure 4:
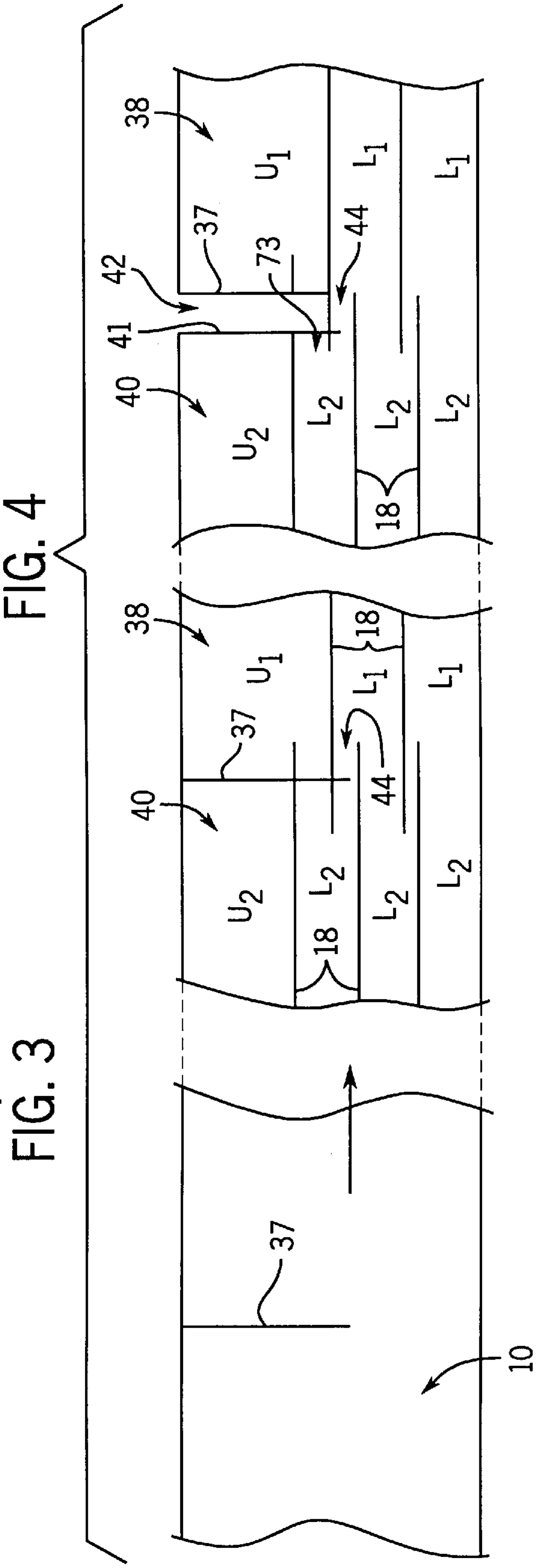
FIG. 4 is a schematic view similar to FIG. 1, showing another order change sequence.

A somewhat different order change sequence is shown in FIG. 4, but is also enabled by a transverse slit 37 severing half the width of the web 10 by operation of the gapless rotary shear 32, as described above. As the transverse slit 37, defining the order change region, passes through the slitter-scorer station 9, the slitting and scoring tools 13 and 14 are withdrawn from the running order 38 and the slitting and scoring tools 16 and 17 are plunged into operative engagement with the web 10 for the new order 40. In the FIG. 4 sequence, upper output web $U_1$ of the running order is substantially wider than the upper output web $U_2$ of the new order. Nevertheless, the transverse slit 37 provides an interruption in the running web sufficient to allow readjustment of the web selecting device 27 enabling the innermost portion of upper output web $U_1$ to be redirected downwardly to form the innermost edge portion of the innermost new order output web $L_2$. Overall web continuity of the lower web portions $L_1$ and $L_2$ is maintained because the transverse slit 37 does not extend laterally far enough to completely sever the innermost new order lower output web $L_2$, as shown by unsevered portion 44.

In the final transitional view of the FIG. 4 sequence, running order web $U_1$ has been accelerated by the overspeed pull roll at the knife 23 to define a gap 42. Operation of the shear 32 may be timed such that the transverse slit 37 coincides exactly with the order change and leading edge 41 of new upper out $U_2$ defines the leading edge of the first sheet of the new order. The overlapping slit and score lines associated with the running and new order lower level outs $L_1$ and $L_2$ are scrapped out, as described in the FIG. 2 system, in sheets which go out respectively onto the top of the last stack for the old order and the bottom of the first stack for the new order.

In all of the foregoing examples, the transverse slit 33, 37 or 47 must extend inwardly from the lateral edge of the web 10 to sever at least a portion of the web representative of the larger of the total width or widths of the running order 38 and new order 40, selected from either the upper output web portions 25 or the lower output web portions 26. Thus, in the example of FIG. 2, the transverse slit 33 must be at least as long as the width of new order upper output web $U_2$ (which is wider than running order upper output web $U_1$). In the FIG. 3 example, the slit 47 was taken from the edge opposite that of FIG. 2, resulting in a substantially longer slit but one which obviated a potential web handling problem. In the FIG. 4 example, the transverse slit 37 must be at least as long as the total width of running order upper output web $U_1$ (which is wider than new order upper output web $U_2$). A further consideration is that the innermost running order and new order output webs for the unslit portion of the main web 10 (in the FIG. 2 and FIG. 4 examples, innermost webs $L_1$ and $L_2$) remain at least partially uncut by the respective transverse slits 33 and 37. These uncut transition portions are shown by the reference numbers 43 in FIG. 2 and 44 in FIG. 4. In the FIG. 3 example, the corresponding portions not cut by transverse slit 47 are the common portions of $U_1$ and $U_2$. A final consideration is that the transverse slit 33 or 37 should ordinarily be provided in the portion of the web representative of the narrower of the new order upper and lower output web portions 25 or 26. In the FIG. 2 example, the choice is not readily apparent because the upper output web $U_2$ is approximately equal to the combined widths of the lower output webs $L_2$. However, in the FIG. 3 example, the transverse slit 47 is made from the opposite edge of the web 10 for the reason discussed above, even though the respective new order output webs in FIGS. 2 and 3 are the same. In the FIG. 4 example, however, new order upper output web $U_2$ is clearly narrower than the combined widths of new order lower output webs $L_2$. The transverse slit 37 should, therefore, run only from the edge of the web as shown. Otherwise, the slit 37 of approximately half the web width, if made from the opposite edge defined by the lower web portions $L_1$ and $L_2$, would not completely sever the web portions eventually represented by the total width of new order lower output web portions $L_2$. As a result, the innermost portion of upper output web $U_1$ could not be redirected downwardly in the selector table 27 to form the innermost edge portion of the innermost new order output web $L_2$. However, as discussed below with respect to FIG. 7, a shear with an adjustable slit length may be used to provide a transverse slit from the opposite edge that is substantially more than half the width of the web and sufficient to completely severe all of the web portions $L_2$ for the new order. Alternately and in lieu of the use of a shear with such a long slit capability, a full gap-type order change strategy could be utilized.

Figure 6:
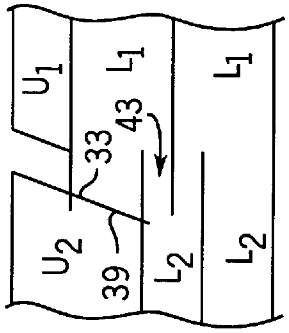
FIG. 6 is a schematic view similar to FIG. 5 showing a reverse slit orientation.
Figure 5:
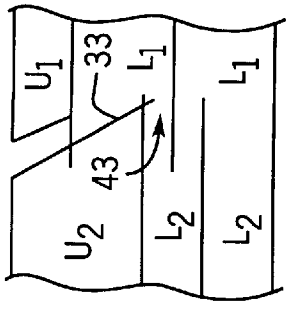
FIG. 5 is a schematic view showing a variation in the orientation of the transverse slit line of FIG. 2.

Other means may also be utilized to provide the transverse slits 33, 37 or 47. For example, a traveling cutting tool could be positioned above the web near the center to plunge into the web and slit laterally outwardly toward the side edge, while moving downstream on the fly. Such a tool could also be utilized without on the fly movement, such that slitting movement toward the side in a direct transverse direction would result in an angled slit. This latter configuration is shown in FIG. 5 which is otherwise similar to the last of the sequential figures in FIG. 2. FIG. 6 shows a slit configuration similar to that shown in FIG. 5, but utilizing slitting movement inwardly from one side edge toward the center. It is believed that utilizing a diagonal slit strategy of FIG. 6 in lieu of the transverse slit shown and described with respect to FIG. 2 would avoid potential problems described above, yet avoid the necessity of making a much longer transverse slit from the opposite edge as described with respect to the FIG. 3 embodiment. Referring to the view of FIG. 6, the web selector forks in the web selecting device 27 that are initially down in the order change region 34 to allow innermost output web $L_1$ to go to the lower slider table 29, may be pivoted sequentially in a lateral direction to “ripple” up to direct the angular transition portion 39 to the upper slider table 19. A possible disadvantage of this strategy, as compared to the FIG. 3 strategy utilizing a cut from the opposite edge of the web, are the resultant diagonal scrap pieces that are not likely to stack well. It would also be possible to utilize a special rotary shear running the full width of the web, but having right and left hand blades 180° out of phase, each of which could provide a transverse slit inwardly from each of the edges. This embodiment, however, would require orders to be sequenced to have the narrow outs alternately on opposite sides of the web. Any of the transverse slits used to provide the partial sever in any of the embodiments described herein may be provided by a water jet slitter. Such a water jet slitter would be powered in the cross machine direction at order change and controlled to make either a true transverse slit or a diagonal slit. A true transverse slit, normal to the direction of web travel as slit 33 in FIG. 2, would require control of the water jet on two axes. To provide a diagonal slit, such as shown in FIG. 5, requires only single axis control.

Figure 7:
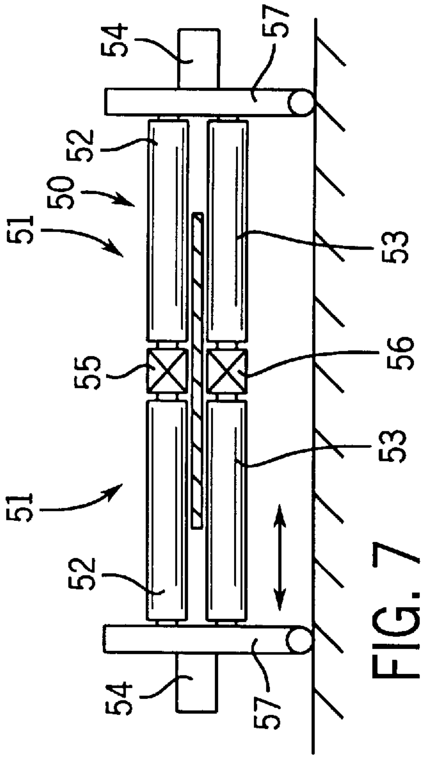
FIG. 7 is a machine direction elevational view showing a rotary shear especially adapted for use with the present invention.

One disadvantage of the order change strategy described with respect to FIG. 3 is the need to provide a transverse slit 47 which is substantially longer than half the width of the web 10. Furthermore, in order to handle similar order changes which are laterally reversed, means would have to be provided to make a similarly extended transverse slit from the opposite edge of the web. One means for accommodating such a requirement and for also providing transverse slits which are as short as possible and still meet the requirements of the order change, is shown in FIG. 7. Rotary shear 50 includes two independently driven pairs of shear cylinders 51. Thus, one pair 51 of upper and lower cylinders 52 and 53 is driven by one drive unit 54, while the other pair 51 of upper and lower cylinders 52 and 53 is driven by the opposite drive unit 54 on the other side of the web. Each axially aligned pair of upper cylinders 52 is supported by a common intermediate bearing 55 and, similarly, each axially aligned pair of lower cylinders 53 is supported by a common intermediate lower bearing 56. The lateral supports 57, supporting the outer ends of the cylinders and the respective drive units 54 are mounted to be shifted laterally in unison in the cross machine direction as shown by the arrows in FIG. 7. This arrangement allows a transverse slit to be made in the web from either side edge and of a length up to the length of the shear cylinders which may be selected to be slightly or substantially longer (e.g. 75 in.) than one-half the maximum web width. A similar transverse slit capability could be provided by utilizing two shears, positioned adjacent one another in the direction of web movement, with one shear capable of cutting on one side of the web, for example, two-thirds of the way or less across the width, and the other shear capable of cutting on the other side of the web, also two-thirds of the way across or less.

Figure 9:
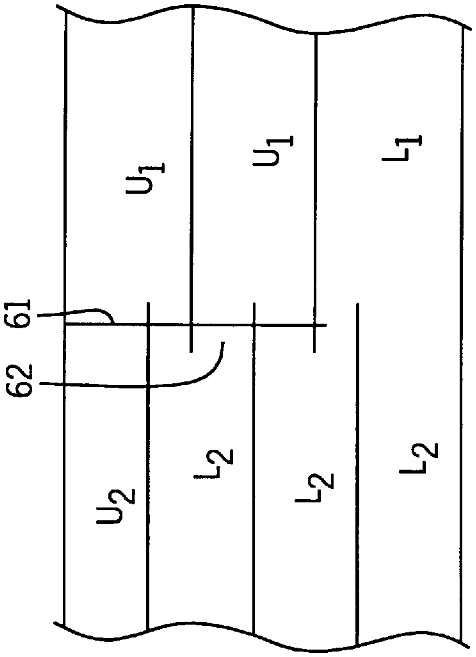
FIGS. 8 and 9 are schematic views of special order change configurations which require modified handling.
Figure 8:
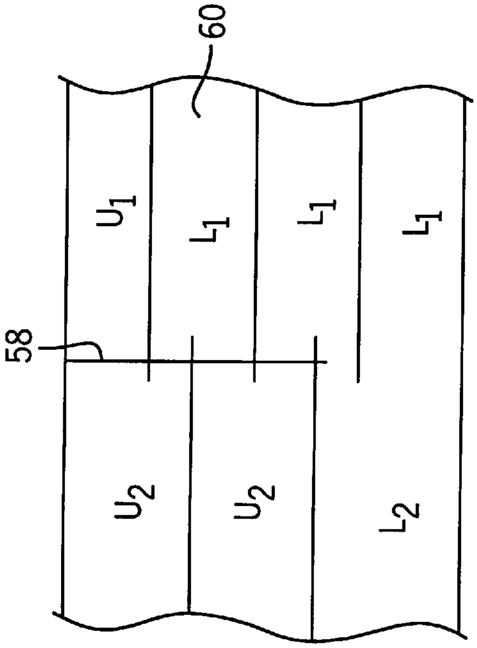

FIGS. 8 and 9 show special cases in which the order change results in a change in the total widths of the respective upper knife outs $U_1$ and $U_2$ and the lower cutoff knife outs $L_1$ and $L_2$, such that the partial transverse slit must be extended so far that it completely severs one of the output webs associated with the knife group which is not completely slit. For example, in FIG. 8, the transverse slit 58 must be long enough to fully sever all of the upper knife new order out webs $U_2$ (i.e. the portion of the web representative of the larger of the total widths of the running and new order widths of the upper output web portions). However, the transverse slit 58 also results in totally severing the innermost running order lower output web $L_1$, identified as out 60. Nevertheless, the discontinuity in the web portion 60 going to the lower level knife is not likely to cause a problem, since the tail end of $L_1$ out 60 will be handled by the lower knife pull roll and continue to travel with the rest of the output web portions $L_1$ and $L_2$ defining the gapless portion of the order change.

In FIG. 9, a similar large change in the relative widths of the outs for the running and new orders is shown. In this case, however, the transverse slit 61 (in order to completely sever both running order upper output web portions $U_1$) of necessity severs all of the innermost new order lower output web portion $L_2$, identified by the reference number 62. The discontinuity formed in $L_2$ out 62 requires that it must be thread-up independently of the remaining gapless portion of the order change $L_1$ and $L_2$. The thread-up of output web portion 62 would be handled in the same manner as in a gap type system.

When an order change is made, it is often necessary to also change the widths of the web edge trim pieces. Edge trim pieces are also continuously slit during the order run and a change in edge trim width will require a transition during order change similar to the change in the widths of the output web portions. The transverse slit strategy of the present invention may be utilized to automatically pick-up the edge trim change on one side of the web. Edge trim adjustment on the opposite side of the web may be easily effected in a number of ways.

Figure 10:
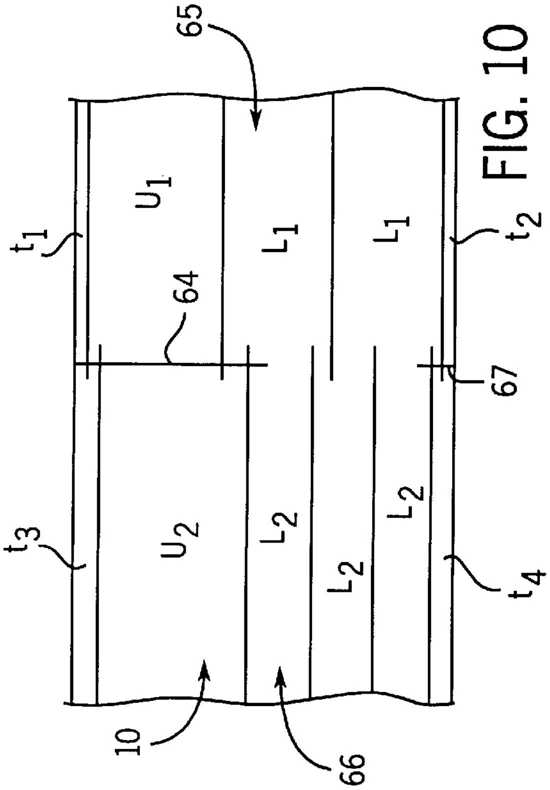
FIG. 10 is a schematic view of an order change showing how edge trim changes are handled.

Referring to FIG. 10, the total width of web 10 is equal to the total width of running order 65 (upper output web $U_1$ plus lower output webs $L_1$) plus the trim widths $t_1$ and $t_2$. In the new order 66, the same web width is comprised of upper output web $U_2$ and lower output webs $L_2$ plus the new trim widths $t_3$ and $t_4$. Most conveniently, the transverse cut to provide the transition between edge trim $t_1$ and edge trim $t_3$ is provided with the transverse slit 64 made by the rotary shear 32 as previously described. A separate trim slit 67 in the opposite edge of the web 10, to provide the transition between edge trims $t_2$ and $t_4$, may be provided, for example, by another rotary shear. However, either or both of the transverse slits 64 and 67 could be provided by slitting tools operable in the cross web direction, such as those described above with reference to FIGS. 5 and 6.

Figure 11:
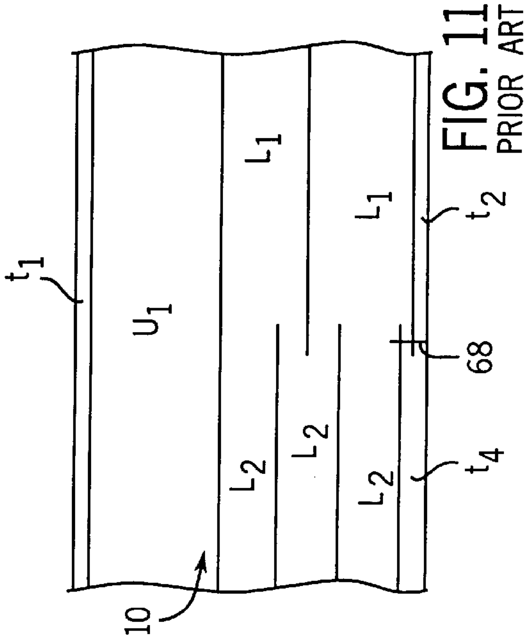
FIG. 11 PRIOR ART
FIG. 11 is a schematic view of a prior art continue order run which is an exception to the present invention.

FIG. 11 shows a special order change situation where the running order does not change in width on one level. In this case, the upper output web $U_1$ does not change in width. This is referred to in the industry as a "continue order" and it allows extremely long runs to be continued on one level (i.e. $U_1$), while short orders requiring frequent order changes are handled on the other level (e.g. $L_1$ to $L_2$ in FIG. 11). With a continue order, no transverse slit is required at order change. In the order change region $L_1$ and $L_2$, the running order slitting and scoring tools 13 and 14 are withdrawn and the repositioned new order slitting and scoring tools 16 and 17 are plunged in. A short edge trim slit 68, similar to slit 67 in FIG. 10, is required for the lower level changed order. The scrap sheets generated on the lower level are directed to the top and bottom respectively of the $L_1$ and $L_2$ stacks, as previously described above.

The order change strategies thus far described have all utilized transverse slits (e.g. 33, 37 and 47) that are made with a slitting device (e.g. rotary shear 32) which is located upstream of the slitter scorer station 9. However, all of the foregoing order changes may be effected by making the transverse slit anywhere upstream of the web selector device 27. For example, the rotary shear or other device for providing the partial transverse web slit could be located between the scoring station 15 and the slitting station 12, or between the slitting station 12 and the web selector 27. An advantage of locating the web slitting device immediately downstream of the slitting station 12 is that the trim chutes, which catch and divert the edge trim pieces, may be located immediately downstream of the device for providing the transverse slit so that the trim transition piece (e.g. $t_1$ to $t_3$ in FIG. 10) would not have to travel between slitting tool pairs 13 and 16 where loss of control and jam-up of the lead edge of a trim piece could occur. A disadvantage of locating the transverse slitting device downstream of the slitter-scorer is that the overspeed on the pull roll of the downstream cut-off knife 21 would provide less time to pull the gap (e.g. 48 in FIG. 3) in which to adjust the forks in the web selector device 27.

I claim:

1. An apparatus for providing a gapless order change in a corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife, and a web selector device between the slitter-scorer and the cut-off knives for selectively separating the output webs into upper output web portions and lower output web portions for said respective upper knife and lower knife, said apparatus comprising:

a pair of web cutting rotary shears upstream of the web selector device positioned to provide generally transverse slits from opposite lateral edges of the web and of a fixed length approximately one-half the width of the web in an order change region of the web defining a change in total width of said respective upper and lower output web portions from a running order to a new order, said transverse slit extending inwardly from one lateral edge and severing a portion of the web representative of the larger of the total widths of the running and new order widths of one of said upper and lower output web portions, and such that the innermost running order and new order output webs of the other of said upper and lower output web portions remain at least partially uncut by said transverse slit.

2. The apparatus as set forth in claim 1 wherein said web selector device is positioned in said order change region on a portion of the innermost output web of the running order cut by said transverse slit.

3. The apparatus as set forth in claim 1 wherein the slitter-scorer includes an independently operable slitter-scorer tool for each of the running and new orders, and said order change region includes longitudinally overlapping slit lines and score lines of said running and new orders.

4. The apparatus as set forth in claim 3 wherein said slitter-scorer is positionable to move the running order slitter-scorer tools out of operative engagement and the new order slitter-scorer tools into operative engagement with the web in said order change region.

5. The apparatus as set forth in claim 1 wherein the rotary shear comprises a pair of shearing blades mounted axially separated and 180° out of phase, each of said blades adapted to provide a transverse slit from an opposite lateral edge over approximately one-half the width of the web.

6. The apparatus as set forth in claim 1 wherein each of said web cutting devices comprises a rotary shear mounted to slit an opposite edge of the web.

7. The apparatus as set forth in claim 1 wherein each of said cutting devices is constructed to make a transverse slit perpendicular to the edge of the web.

8. The apparatus as set forth in claim 1 wherein each of said cutting devices is constructed to make a transverse slit at an acute angle to a line perpendicular to the edge of the web.

9. A method for providing a gapless order change in a corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife, and a web selector device between the slitter-scorer and the cut-off knives for selectively separating the output webs into upper output web portions and lower output web portions for said respective upper knife and lower knife, said method comprising the steps of:

(1) determining an order change region in the web defining a change in total widths of the respective upper and lower output web portions from a running order to a new order;

(2) severing the web upstream of the web selector device to provide a generally transverse slit in the order change region from one edge of the web inwardly to subsequently sever at least the innermost of both running order and new order output webs corresponding to said one edge;

(3) adjusting the slitter-scorer in the order change region to terminate the running order slit and score lines and to begin the new order slit and score lines; and, (4) maintaining the continuity of the innermost running order and new order output webs corresponding to the other edge of the web.

10. The method as set forth in claim 9 wherein said adjusting step comprises:

(1) moving a first set of slitter-scorer tools out of operative engagement with the web; and (2) moving a second set of slitter-scorer tools into operative engagement with the web.

11. The method as set forth in claim 9 wherein said severing step comprises cutting the web with a rotary shear.

12. The method as set forth in claim 9 wherein said severing step provides a transverse slit extending to approximately the longitudinal centerline of the web.

13. The method as set forth in claim 9 wherein said transverse slit extends from the edge of the web containing the narrower of the new order upper and lower output web portions.

14. The method as set forth in claim 9 including the step of timing the severing step to make the transverse slit coincide with the order change.

15. An apparatus for providing a gapless order change in a corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife, and a web selector device between the slitter-scorer and the cut-off knives for selectively separating the output webs into upper output web portions and lower output web portions for said respective upper knife and lower knife, said apparatus comprising:

a pair of rotary shears upstream of the web selector device positioned laterally spaced to provide generally transverse slits from opposite lateral edges of the web and of a length approximately one-half the width of the web in an order change region of the web defining a change in total width of said respective upper and lower output web portions from a running order to a new order, said transverse slit extending inwardly from one lateral edge and severing at least a portion of the web representative of the larger of the total widths of the running and new order widths of one of said upper and lower output web portions, and such that at least a pair of longitudinally contiguous running order and new order output web portions of the other of said upper and lower output web portions remain at least partially uncut by said transverse slit.

16. A method for providing a gapless order change in a corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife, and a web selector device between the slitter-scorer and the cut-off knives for selectively separating the output webs into upper output web portions and lower output web portions for said respective upper knife and lower knife, said method comprising the steps of:

(1) determining an order change region in the web defining a change in total widths of the respective upper and lower output web portions from a running order to a new order;

(2) adjusting the slitter-scorer in the order change region to terminate the running order slit and score lines and to begin the new order slit and score lines, such that a new slit line dividing the new order upper and lower output web portions is offset transversely of the web from a running slit line dividing the running order upper and lower output web portions, such offset being in a given lateral direction resulting in a total width of one of said new order upper and lower output web portions greater than the corresponding one of the running order upper and lower output web portions; and (3) severing the web upstream of the web selector device to provide a generally transverse slit in the order change region, said transverse slit extending from the edge of the web lying in said given direction a distance sufficient to sever the running order output web portions corresponding to said web edge.

17. The method as set forth in claim 16 wherein the web between the new slit line and the running slit line in the order change region defines a redirected web portion, and including the step of accelerating the severed running order output web portions to provide a gap for said redirected web portion.

* * * * *